United States Patent [19]

Maniar et al.

[11] 4,245,145

[45] Jan. 13, 1981

[54] FERRITIC STAINLESS STEEL WELD WIRE SUITABLE FOR GMA WELDING

[75] Inventors: Gunvant N. Maniar, Reading; Joseph B. Koch, Sinking Spring; Royal D. Thomas, Jr., Narberth, all of Pa.

[73] Assignee: Carpenter Technology Corporation, Reading, Pa.

[21] Appl. No.: 71,579

[22] Filed: Aug. 31, 1979

[51] Int. Cl.$^3$ ............... B23K 35/30; B23K 35/38
[52] U.S. Cl. .................. 219/146.1; 219/74; 219/146.24; 219/146.41
[58] Field of Search ............... 219/74, 146.1, 146.23, 219/146.24, 146.41

[56] References Cited

U.S. PATENT DOCUMENTS

| | | | |
|---|---|---|---|
| 2,939,942 | 6/1960 | Scheil | 219/74 |
| 3,250,611 | 5/1966 | Lula | 75/126 |
| 3,476,909 | 11/1969 | Kameda | 219/146.1 X |
| 3,596,053 | 7/1971 | Kameda | 219/146.1 X |
| 3,644,697 | 2/1972 | Krahl | 219/74 |
| 4,005,309 | 1/1977 | Zvanut | 219/146.1 X |

FOREIGN PATENT DOCUMENTS

| | | | |
|---|---|---|---|
| 1943369 | 3/1971 | Fed. Rep. of Germany | 219/146.23 |
| 478623 | 1/1938 | United Kingdom | 219/146.23 |

*Primary Examiner*—Richard R. Kucia
*Attorney, Agent, or Firm*—Edgar N. Jay

[57] ABSTRACT

A ferritic stainless steel weld wire for forming a ferritic weld deposit free of martensite under a gas blanket containing a reactive component. The weld wire contains in weight percent about

| | w/o |
|---|---|
| Carbon | 0.04 maximum |
| Manganese | 1.0 maximum |
| Silicon | 1.0 maximum |
| Phosphorous | 0.045 maximum |
| Sulfur | 0.045 maximum |
| Chromium | 10.50–12.00 |
| Titanium | 0.30–0.75 |
| Nitrogen | 0.02 maximum |
| Nickel | 0.25 maximum |
| Molybdenum | 0.50 maximum |
| Copper | 0.50 maximum |
| Cobalt | 0.25 maximum | and the balance iron. The ratio of the weight percent titanium to the sum of the weight percent carbon plus the weight percent nitrogen is at least 12.5:1 in the weld wire and at least 8:1 in the weld deposit.

9 Claims, No Drawings

FERRITIC STAINLESS STEEL WELD WIRE SUITABLE FOR GMA WELDING

This invention relates to a ferritic stainless steel and, more particularly, to a consumable weld wire having a stable ferritic microstructure especially well suited for glass in gas metal arc (GMA) welding under a gas blanket which includes a reactive component.

Corrosion-resistant ferritic stainless steels have hitherto been provided for use in the manufacture of welded automobile exhaust system parts. For example, U.S. Pat. No. 3,250,611 granted to R. A. Lula and W. G. Renshaw on May 10, 1966 discloses a composition containing in weight percent (w/o)

|  | Broad | Preferred |
| --- | --- | --- |
| Carbon | 0.01–0.10 | 0.02–0.06 |
| Manganese | Traces–1.0 | Traces–0.50 |
| Silicon | Traces–0.75 | Traces–0.30 |
| Chromium | 10.0–12.5 | 10.5–11.5 |
| Titanium | 0.20–0.75 | 0.30–0.50 |
| Iron | Bal. | Bal. |

However, such a composition leaves much to be desired when gas metal arc welding is carried out under a gas blanket which is not entirely or substantially inert. For example, when such consumable electrode welding is carried out under an argon-hellium blanket made up by volume of about 75% argon and 25% helium the weld wire consumed and the weldment do not differ significantly in composition. That is to say, there is no significant increase in the carbon plus nitrogen content or loss in titanium in the composition of the weldment as compared to the composition of the consumable weld wire. When the gas utilized includes a reactive component then the composition of the weldment can and frequently does differ in a significant way from that of the consumable weld wire. And when the composition of the weldment results in a loss of desired mechanical and/or chemical properties, the integrity of the weld and its ability to withstand stress or corrosion could be impaired to such an extent as to lead to premature or even catastrophic failure of the weld. Thus, when a composition such as that noted above is welded under a gas blanket which includes a reactive component such as oxygen or carbon dioxide then the composition of the weldment will differ from the starting composition. When oxygen is the reactive component there can be as much as a 25 w/o to 30 w/o loss in titanium while in the case of carbon dioxide less titanium is lost (about half as much) but there is also a significant increase in carbon content so that the net effect could be an even lower ratio of the weight percent of Ti/C+N although at a somewhat higher titanium level.

It is, therefore, a principal object of this invention to provide a stable ferritic stainless steel weld wire having a composition which consistently provides weld deposits essentially free of martensite and having good ductility when laid down under a welding arc atmosphere containing a reactive component.

Another object is to provide such a weld wire having good formability, good mechanical properties including ductility and corrosion resistance, and which retains those properties when used as a consumable electrode in carrying out gas metal arc welds under a gas blanket containing a reactive component such as oxygen or carbon dioxide.

Further objects and advantages of the present invention will be apparent from the following detailed description of preferred embodiments thereof.

The weld wire of the present invention is made from a weld wire composition stabilized against the formation of martensite and sensitization to intergranular or pitting corrosion in the weld deposit by the presence of an amount of titanium in excess of that required to tie up the carbon and nitrogen present in the weld wire. The amount of titanium is large enough so that the amount retained in the weld deposit is sufficient to stabilize the carbon and nitrogen present even though a substantial amount of titanium is lost during the welding process and in some instances a substantial amount of carbon is added as when carbon dioxide is included in the gas blanket. Carbon and nitrogen are not desirable additions to the composition from which the weld wire is made. While standard vacuum melting production techniques for making AISI 400 series ferritic stainless steel can readily provide low nitrogen contents, less than 0.02 w/o, preferably less than 0.01 w/o, it is usually considered too expensive to hold carbon to such low levels when the end products are such items as parts of automobile exhaust systems which are produced in large quantities by high speed, mass production techniques. Thus, nitrogen is preferably kept below 0.01 w/o and carbon may range upward from about 0.01 or 0.015 w/o to no more than about 0.04 w/o.

Chromium provides the stainless properties of the weld deposit as well as corrosion resistance and ductility. To that end a minimum of about 10.50 w/o preferably 11.50 w/o is used. Above about 12.00 w/o additional amounts of chromium do not provide sufficient increase or improvement in desired properties to warrant the added cost.

It is essential that a minimum of 0.30 w/o titanium be present in the weld wire of the present invention if the desired stability and ductility of the weld deposit are to be attained. It is also necessary to ensure that no more than about 0.75 w/o titanium is present because above that amount, the excess titanium contributes to age hardening and consequent impairment of the ductility of the weld deposit after long exposure to elevated temperatures such as are encountered in use by the parts of automobile exhaust systems. It is also essential that the titanium content and the carbon plus nitrogen content be controlled so that the ratio of the weight percent titanium to the weight percent of carbon plus nitrogen be at least about 12.5:1; preferably at least 15:1 in the weld wire and at least about 8:1 preferably at least about 10:1 in the weld deposit, best ductility being provided by the larger amounts of titanium at a given ratio.

Optional elements include manganese up to a maximum of about 1 w/o, silicon up to a maximum of about 1 w/o, phosphorus about 0.045 w/o maximum, sulfur about 0.045 w/o maximum and boron 0.005 w/o maximum. While the preferred weld wire composition contains about 0.30–0.60 w/o manganese, 0.40–0.70 w/o silicon, about 0.030 w/o maximum phosphorus, about 0.015 w/o maximum sulfur and about 0.0025 w/o maximum boron, it is not necessary, and it is, therefore, advantageous that such elements as manganese, silicon, phosphorus and sulfur need not be held to extremely low levels. The balance of the weld wire composition is essentially iron plus small amounts, that is up to several tenths percent, of tolerable impurities. Such elements as nickel, molybdenum, copper and cobalt are kept low, nickel 0.25 w/o maximum, molybdenum 0.50 w/o maximum, copper 0.50 w/o maximum and cobalt 0.25 w/o maximum.

While broad and preferred ranges have been given herein for the various elements it is to be understood that the preferred ranges of one or more of the elements can be used with the broad ranges of the remaining elements. It is also recognized that the minimum and maximum amounts of the broad and preferred range for an element can be combined respectively with the maximum and minimum amounts of the preferred range for that element. It is intended to include such intermediate ranges within the scope of the present invention.

While gas blankets used in carrying out gas metal arc welding are well known in the art and can vary widely it may be well to note here that the argon-oxygen gas mixture usually contains about 1-5 volume percent oxygen and the balance essentially argon. The argon-oxygen gas mixture preferably used in one containing about 2 volume percent oxygen and about 98 volume percent argon. The weld wire of the present invention in providing a ductile, impact resistant weld deposit laid down under a mixture of argon and oxygen has the further benefit of the advantages flowing from the use of an argon-oxygen gas blanket, that is, arc stability, reduced tendency to form weld discontinuities such as undercut, improved weld bead appearance and reduced depth of the papilla normally associated with weld penetration as metal as transferred from the weld wire to form the weld deposit with high welding current density. Another reactive component-containing gas mixture used is one containing helium, argon and carbon dioxide, e.g. about 90 volume percent helium, about 7.5 volume percent argon and about 2.5 volume percent carbon dioxide.

The weld wire composition of the present invention is readily melted using conventional vacuum melting techniques or under a protective inert gas such as argon to limit titanium loss and nitrogen pickup. The metal is cast as ingots which are readily hot worked and shaped to provide the weld wire of this invention using working and wire drawing practices that are standard for the AISI 400 series stainless steel. Hot working is preferably carried out between about 950°-1120° C. Annealing when required is preferably at about 760°-780° C. for about one hour for each inch of thickness.

As a preferred example of the weld wire composition, a heat was melted under vacuum and cast into ingots containing in weight percent

|  | w/o |
| --- | --- |
| Carbon | 0.032 |
| Manganese | 0.41 |
| Silicon | 0.51 |
| Phosphorus | 0.011 |
| Sulfur | 0.008 |
| Chromium | 11.88 |
| Titanium | 0.63 |
| Nitrogen | 0.0074 |
| Boron | 0.0019 |
| Ti/C + N | 15.99 |

The balance was iron and incidental impurities which included less than 0.10 w/o of each of the elements molybdenum, copper and cobalt. The material was hot worked from 950° C. to 4 inch sq. (10.16 cm sq.) billets which were readily hot rolled from a starting temperature of 1065° C. to 0.250 inch (0.64 cm) round redraw rod which was annealed at 760°-780° C. for about 15 minutes and prepared for cold drawing. The rod was initially soap-drawn to 0.110 inch (0.28 cm), cleaned, annealed at 1400° F. (760° C.) and soap-drawn to 0.075 inch (0.19 cm), followed by cleaning and reannealing. It was then bright drawn using a liquid lubricant to 0.062 inch (0.16 cm). When desired, smaller diameter wire as for example 0.035-0.045 inch (0.09-0.11 cm) can also be made by further drawing the wire, reannealing as required.

The weld wire thereby provided can be used to lay down weld deposits under an argon-oxygen gas mixture having good ductility and corrosion resistance and capable of withstanding substantially instantaneously applied high stresses which may be greater than the yield strength of the composition.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Ferritic stainless steel weld wire for forming a ferritic weld deposit free of martensite under a gas blanket containing a reactive component, said weld wire consisting essentially in weight percent of about

|  | w/o |
| --- | --- |
| Carbon | 0.04 maximum |
| Manganese | 1.0 maximum |
| Silicon | 1.0 maximum |
| Phosphorous | 0.045 maximum |
| Sulfur | 0.045 maximum |
| Chromium | 10.50-12.00 |
| Titanium | 0.30-0.75 |
| Nitrogen | 0.02 maximum |
| Nickel | 0.25 maximum |
| Molybdenum | 0.50 maximum |
| Copper | 0.50 maximum |
| Cobalt | 0.25 maximum | the balance being essentially iron, and the ratio of the weight percent titanium to the sum of the weight percent carbon plus the weight percent nitrogen is at least 12.5:1 in said weld wire and at least 8:1 in said weld deposit.

2. The weld wire as set forth in claim 1 in which said gas blanket consists essentially of argon and oxygen.

3. The weld wire as set forth in claim 1 in which said gas blanket consists essentially of about 1-5 percent by volume oxygen and the balance essentially argon.

4. The weld wire as set forth in claim 1 in which said gas blanket consists essentially of about 2 percent by volume oxygen and about 98 percent by volume argon.

5. The weld wire as set forth in claims 1, 2, 3, or 4 which contains about 0.01-0.04 w/o carbon.

6. The weld wire as set forth in claim 5 which contains 0.01 w/o maximum nitrogen.

7. The weld wire as set forth in claim 6 which contains about 11.50-12.00 w/o chromium.

8. The weld wire as set forth in claim 7 which contains about 0.30-0.60 w/o manganese, and about 0.40-0.70 w/o silicon, about 0.030 maximum phosphorus, about 0.015 w/o maximum sulfur, and about 0.0025 w/o maximum boron.

9. The weld wire as set forth in claim 7 in which the ratio of the weight percent titanium to the sum of the weight percent carbon plus the weight percent nitrogen is at least about 15:1 in said weld wire and at least about 10:1 in said weld deposit.

* * * * *

UNITED STATES PATENT OFFICE
CERTIFICATE OF CORRECTION

PATENT NO. : 4,245,145

DATED : January 13, 1981

INVENTOR(S) : Gunvant N. Maniar, Joseph B. Koch & R. David Thomas, Jr.

It is certified that error appears in the above-identified patent and that said Letters Patent are hereby corrected as shown below:

Col. 1, line 8, for "glass" read -- use --;

Col. 1, line 30, for "hellium" read -- helium --.

Col. 3, line 19, for "in" read -- is --;

Col. 3, line 29, for "as" second occurrence should read -- is --.

Signed and Sealed this

Twenty-first Day of April 1981

[SEAL]

Attest:

RENE D. TEGTMEYER

Attesting Officer        Acting Commissioner of Patents and Trademarks